US012073299B2

(12) United States Patent
Neelakantan et al.

(10) Patent No.: US 12,073,299 B2
(45) Date of Patent: Aug. 27, 2024

(54) SYSTEMS AND METHODS FOR USING CONTRASTIVE PRE-TRAINING TO GENERATE TEXT AND CODE EMBEDDINGS

(71) Applicant: OpenAI OpCo, LLC, San Francisco, CA (US)

(72) Inventors: Arvind Neelakantan, San Francisco, CA (US); Tao Xu, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 18/158,166

(22) Filed: Jan. 23, 2023

(65) Prior Publication Data
US 2024/0249186 A1 Jul. 25, 2024

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| | | | | |
|---|---|---|---|---|
| 11,544,317 B1* | 1/2023 | Pancha | .................. | G06F 16/483 |
| 2021/0319266 A1* | 10/2021 | Chen | ..................... | G06V 10/764 |
| 2022/0374595 A1* | 11/2022 | Gotmare | ................. | G06F 40/40 |
| 2023/0059494 A1* | 2/2023 | Hunter | ..................... | G06F 40/30 |
| 2023/0075087 A1* | 3/2023 | Jenni | ..................... | G06V 10/454 |

OTHER PUBLICATIONS

Giorgi, John, et al. "Declutr: Deep contrastive learning for unsupervised textual representations." arXiv preprint arXiv:2006.03659 (2020). (Year: 2020).*
Khosla, Prannay, et al. "Supervised contrastive learning." Advances in neural information processing systems 33 (2020): 18661-18673. (Year: 2020).*

(Continued)

*Primary Examiner* — Daniel T Pellett
(74) *Attorney, Agent, or Firm* — Finnegan, Henderson, Farabow, Garrett & Dunner LLP (57) ABSTRACT

Embodiments of the present disclosure may include systems, methods, and computer readable media for generating a vector representation, including receiving a training data set, the training data set including a plurality of paired data samples corresponding to positive example pairs, each positive example pair including a first data unit and a second data unit. Embodiments may also include converting the training data set into at least one first vector of a vector representation. Embodiments may further include accessing one or more negative example pairs to contrast against the positive example pairs. Embodiments may also include converting the one or more negative example pairs into one or more second vectors of the vector representation. Embodiments may further include training an artificial machine learning model to generate additional vectors of the vector representation. Further embodiments may include systems, methods, and media for determining semantic similarity based on one or more vector representations.

20 Claims, 5 Drawing Sheets

(56) References Cited

OTHER PUBLICATIONS

Neelakantan, Arvind, et al., "Text and Code Embeddings by Contrastive Pre-Training", arXiv:2201.10005v1 [cs. CL] Jan. 24, 2022, 13 pages.
Bengio et al., Representation learning: A review and new perspectives. *Transactions on pattern analysis and machine intelligence*, 35 (8), 2012.
Bolukbasi et al., "Man is to computer programmer as woman is to homemaker? debiasing word embeddings." 29, 2016.
Bowman et al., "A large annotated corpus for learning natural language inference." In *Conference on Empirical Methods in Natural Language Processing (EMNLP)*. ACL, 2015.
Brown et al., "Class-based n-gram models of natural language." *Computational Linguistics*, 18(4):467-480, 1992.
Brown et al., "Language models are few-shot learners." In *Advances in Neural Information Processing Systems*, 2020.
Caliskan et al., "Semantics derived automatically from language corpora contain human-like biases." *Science*, 356(6334):183-186, 2017.
Chen et al., "Evaluating large language models trained on code." *arXiv preprint arXiv*:2107.03374, 2021.
Chen et al., "A simple framework for contrastive learning of visual representations." In *International conference on machine learning (ICML)*, 2020.
Chopra et al., "Learning a similarity metric discriminatively, with application to face verification." In *Computer Vision and Pattern Recognition (CVPR)*. IEEE, 2005.
Conneau and Senteval, "An evaluation toolkit for universal sentence representations." *arXiv preprint arXiv*:1803.05449, 2018.
Crawford, "The trouble with bias." Keynote at NeurIPS, 2017.
Deerwester et al., "Indexing by latent semantic analysis." *Journal of the American society for information science*, 41(6):391-407, 1990.
Devlin et al., "Pre-training of deep bidirectional transformers for language understanding." In *Conference of the North American Chapter of the Association for Computational Linguistics (NAACL)*. ACL, 2019.
Fang and Xie, "Cert: contrastive self-supervised learning for language understanding." *arXiv preprint arXiv*:2005.12766, 2020.
Feng et al., "A pre-trained model for programming and natural languages." In *Conference on Empirical Methods in Natural Language Processing (EMNLP)*, 2020.
Formal et al., "SPLADE v2: Sparse lexical and expansion model for information retrieval." *arXiv preprint arXiv*:2109.10086, 2021.
Gao et al., "Simple contrastive learning of sentence embeddings." In *Conference on Empirical Methods in Natural Language Processing (EMNLP)*, 2021.
Giorgi et al., "Deep contrastive learning for unsupervised textual representations." In *Proceedings of ACL/IJCNLP*, 2020.
Goodman, "Seven strictures on similarity." Bobbs Merrill, 1972.
Guo et al., Pretraining code representations with data flow. In *International Conference on Learning Representation (ICLR)*, 2021.
Gutmann, M., and Hyvärinen, A. "Noise-contrastive estimation: A new estimation principle for unnormalized statistical models." In *Conference on Artificial Intelligence and Statistics*. PMLR, 2010.
Guu et al., "Realm: retrieval-augmented language model pretraining." *arXiv preprint arXiv*:2002.08909, 2020.
Hadsell et al., "Dimensionality reduction by learning an invariant mapping." In *Computer Vision and Pattern Recognition (CVPR)*, vol. 2, pp. 1735-1742. IEEE, 2006.
He et al., Momentum contrast for unsupervised visual representation learning. In *Computer Vision and Pattern Recognition (CVPR)*, 2020.
Hofstätter, "Efficiently teaching an effective dense retriever with balanced topic aware sampling." *arXiv preprint arXiv*:2104.06967, 2021.
Husain et al., "CodeSearchNet challenge: Evaluating the state of semantic code search." *arXiv preprint arXiv*:1909.09436, 2020.
Izacard et al., "Towards unsupervised dense information retrieval with contrastive learning." *arXiv preprint arXiv*:2112.09118, 2021.
Jain et al., "Contrastive code representation learning." In *Conference on Empirical Methods in Natural Language Processing (EMNLP)*, 2021.
Jia et al., "Scaling up visual and vision-language representation learning with noisy text supervision." In *International Conference on Machine Learning (ICML)*, 2021.
Johnson et al., "Billion-scale similarity search with gpus." *IEEE Transactions on Big Data*, 2019.
Joshi et al., "A large scale distantly supervised challenge dataset for reading comprehension." In *Conference of the Association for Computational Linguistics (ACL)*. ACL, 2017.
Karpukhin et al., "Dense passage retrieval for open-domain question answering." In *Conference on Empirical Methods in Natural Language Processing (EMNLP)*, 2020a.
Karpukhin et al., "Dense passage retrieval for open-domain question answering." In *Conference on Empirical Methods in Natural Language Processing (EMNLP)*, 2020b.
Khosla et al., "Supervised contrastive learning." *arXiv preprint arXiv*:2004.11362, 2020.
Kim et al., "Vision-and language transformer without convolution or region supervision." In *International Conference on Machine Learning (ICML)*, 2021.
Kingma and Welling, "Auto-Encoding Variational Bayes." In *International Conference on Learning Representation (ICLR)*, 2014.
Kiros et al., Skip-thought vectors. In *Advances in Neural Information Processing Systems (NeuriPS)*, 2015.
Kobayashi, "Contextual augmentation: Data augmentation by words with paradigmatic relations." *arXiv preprint arXiv*:1805.06201, 2018.
Kwiatkowski et al., "Natural questions: a benchmark for question answering research." *Transactions of the Association of Computational Linguistics*, 2019.
Lee et al., "Latent retrieval for weakly supervised open domain question answering." In Korhonen, A., Traum, D. R., and M'arquez, L. (eds.), *Conference of the Association for Computational Linguistics (ACL)*, pp. 6086-6096. ACL.
Lewis et al., "Retrieval augmented generation for knowledge-intensive NLP tasks." In *Advances in Neural Information Processing Systems (NeuriPS)*, 2020.
Li et al., "On the sentence embeddings from pre-trained language models." In *Conference on Empirical Methods in Natural Language Processing (EMNLP)*, 2020.
Liang et al., "Towards debiasing sentence representations." In *Conference of the Association for Computational Linguistics (ACL)*, 2020.
Lin et al., "Pretrained transformers for text ranking: BERT and beyond." *Synthesis Lectures on Human Language Technologies*, 14(4):1-325, 2021.
Logeswaran and Lee, "An efficient framework for learning sentence representations." In *International Conference on Learning Representation (ICLR)*, 2018.
Lu et al., "Pretraining task-agnostic visiolinguistic representations for vision-and-language tasks." *arXiv preprint arXiv*:1908.02265, 2019.
May et al., "On measuring social biases in sentence encoders." In *Conference of the North American Chapter of the Association for Computational Linguistics (NAACL)*, 2019.
Mikolov et al., "Efficient estimation of word representations in vector space." *arXiv preprint arXiv*:1301.3781, 2013.
Nguyen et al., "A human generated machine reading comprehension dataset." *arXiv preprint arXiv*:1611.09268, 2016.
Nogueira et al., "From doc2query to doctttttquery." *Online preprint*, 2019a.
Nogueira et al., "Multistage document ranking with BERT." *arXiv preprint arXiv*:1910.14424, 2019b.
Park et al., "Reducing gender bias in abusive language detection." In *Conference on Empirical Methods in Natural Language Processing (EMNLP)*, 2018.
Pennington et al., "GloVe: Global vectors for word representation." In *Conference on Empirical Methods in Natural Language Processing (EMNLP)*, 2014.
Peters et al., "Deep contextualized word representations." In *Proceedings of NCAAL/IJCNLP*, 2018.

(56) References Cited

OTHER PUBLICATIONS

Qu et al., "An optimized training approach to dense passage retrieval for open-domain question answering." In *Conference of the Association for Computational Linguistics (ACL)*, 2021.
Radford et al., "Learning transferable visual models from natural language supervision." *arXiv preprint arXiv*:2103.00020, 2021.
Raffel et al., "Exploring the limits of transfer learning with a unified text-to-text transformer." *arXiv preprint arXiv*:1910.10683, 2019.
Ramesh et al., Zero-shot text-to-image generation. *arXiv preprint arXiv*:2102.12092, 2021.
Reimers and Gurevych, "Sentence-bert: Sentence embeddings using siamese bert-networks." In *Conference on Empirical Methods in Natural Language Processing (EMNLP)*, 2019.
Robertson, "The Probabilistic Relevance Framework: BM25 and Beyond." *Foundations and Trends® in Information Retrieval*, 2009.
Rudinger et al., "Gender bias in coreference resolution." *arXiv preprint arXiv*:1804.09301, 2018.
Sachan et al., End-to-end training of neural retrievers for open-domain question answering. In Zong, C., Xia, F., Li, W., and Navigli, R. (eds.), *Proceedings of ACL/IJCNLP*, pp. 6648-6662. ACL, 2021.
Santhanam et al., "Effective and efficient retrieval via lightweight late interaction." *arXiv preprint arXiv*:2112.01488, 2021.
Schroff et al., A unified embedding for face recognition and clustering. In *Computer Vision and Pattern Recognition (CVPR)*, 2015.
Shen et al., "A simple but tough-to-beat data augmentation approach for natural language understanding and generation." *arXiv preprint arXiv*:2009.13818, 2020.
Socher et al., "Recursive deep models for semantic compositionality over a sentiment treebank." In *Conference on Empirical Methods in Natural Language Processing (EMNLP)*, 2013.
Sohn, "Improved deep metric learning with multi-class n-pair loss objective." In *Advances in Neural Information Processing Systems (NeuriPS)*, 2016.
Solaiman and Dennison, "Process for adapting language models to society (PALMS) with values-targeted datasets." *arXiv preprint arXiv*:2106.10328, 2021.
Su et al., Whitening sentence representations for better semantics and faster retrieval. *arXiv preprint arXiv*:2103. 15316, 2021.
Sun et al., "Videobert: A joint model for video and language representation learning." In *International Conference on Computer Vision (ICCV)*, 2019.

Thakur et al., "BEIR: A heterogenous benchmark for zero-shot evaluation of information retrieval models." In *Advances in Neural Information Processing Systems (NeuriPS)*, 2021.
Tian et al., "Contrastive Multiview coding." *European Conference on Computer Vision (ECCV)*, 2019.
Van Den Oord et al., "Wavenet: A generative model for raw audio." *arXiv preprint arXiv*:1609.03499, 2016.
Van Den Oord et al., Representation learning with contrastive predictive coding. *arXiv preprint arXiv*:1807.03748, 2018.
Vaswani et al., "Attention is all you need." In *Advances in Neural Information Processing Systems (NeuriPS)*, 2017.
Vervaeke et al., "Relevance realization and the emerging framework in cognitive science." *Journal of logic and computation*, 22(1):79-99, 2012.
Wang et al., "Deep self-attention distillation for task-agnostic compression of pre-trained transformers." *arXiv preprint arXiv*:2002.10957, 2020.
Wei and Zou, "EDA: easy data augmentation techniques for boosting performance on text classification tasks." *arXiv preprint arXiv*:1901.11196, 2019.
Williams et al., "A broad-coverage challenge corpus for sentence understanding through inference." In *Conference of the North American Chapter of the Association for Computational Linguistics (NAACL)*. ACL, 2018.
Wu et al., "Unsupervised feature learning via non-parametric instance-level discrimination." In *Computer Vision and Pattern Recognition (CVPR)*, 2018.
Xiong et al., "Approximate nearest neighbor negative contrastive learning for dense text retrieval." *arXiv preprint arXiv*:2007.00808, 2020.
Yih et al., "Learning discriminative projections for text similarity measures." In *Conference on Computational Natural Language Learning (CoNLL)*. ACL, 2011.
Zbontar et al., "Barlow twins: Self-supervised learning via redundancy reduction." In *International Conference on Machine Learning (ICML)*, 2021.
Zhang et al., "An unsupervised sentence embedding method by mutual information maximization." In *Conference on Empirical Methods in Natural Language Processing (EMNLP)*, 2020.
Zhao et al., "Gender bias in coreference resolution: Evaluation and debiasing methods." *arXiv preprint arXiv*:1804.06876, 2018.

\* cited by examiner

SYSTEMS AND METHODS FOR USING CONTRASTIVE PRE-TRAINING TO GENERATE TEXT AND CODE EMBEDDINGS

FIELD OF THE DISCLOSURE

The disclosed embodiments generally relate to systems, devices, methods, and computer readable media for generating and using text or code embeddings.

BACKGROUND

Embeddings, also referred to as vector representations, are readily consumable by machine learning models and algorithms and thereby provide useful solutions for organizing and working with natural language and code. Embeddings include numerical representations of concepts converted to number sequences, wherein each of the number sequences are mapped to a high-dimensional space. Embeddings are more easily consumable by a computer than their natural language concept constituents, thereby allowing a computer to understand relationships between the concepts.

The computerized systems, methods, and computer readable media disclosed herein extend the capabilities and improve the performance of technologies used for generating and working with text and code embeddings as compared with extant solutions. At the same time, the computerized, systems, methods, and media disclosed herein demand substantially less computation at test time as compared with extant technologies.

SUMMARY

Embodiments of the present disclosure may include a method for generating a vector representation, and the method may include receiving, by one or more hardware processors, a training data set, the training data set including a plurality of paired data samples corresponding to positive example pairs, each positive example pair including a first data unit and a second data unit.

Embodiments of the disclosed method may also include converting, by one or more hardware processors, the training data set into at least one first vector of a vector representation. Embodiments of the disclosed method may also include accessing, by one or more hardware processors, one or more negative example pairs to contrast against the positive example pairs. Embodiments of the disclosed method may also include converting, by one or more hardware processors, the one or more negative example pairs into one or more second vectors of the vector representation. Embodiments of the disclosed method may also include training, by one or more hardware processors, an artificial machine learning model to generate additional vectors of the vector representation. In some embodiments, the training may be based on the at least one first vector of the vector representation and the one or more second vectors of the vector representation.

In some embodiments the step of converting the training data set into at least one first vector of the vector representation may include encoding the first data unit and the second data unit of at least one of the paired data samples independently. In some embodiments, the encoding step may include using an encoder to independently map the first data unit and the second data unit of the at least one of the paired data samples to the vector representation.

In some embodiments, the encoding step may include inserting a first delimiter to a first position of an input sequence including the first data unit and a second delimiter to a second position of the input sequence including the first data unit. Embodiments of the encoding step may also include inserting a third delimiter to a third position of an input sequence including the second data unit and a fourth delimiter to a fourth position of the input sequence including the second data unit.

In some embodiments, the first and second delimiters may be distinct from the third and fourth delimiters. In some embodiments, the method may include generating, by one or more hardware processors, and based at least on the at least one first vector of the vector representation, a similarity score between the first data unit and the second data unit of at least one of the paired data samples.

In some embodiments, the generated similarity score may be based on a cosine similarity between a first vector of the vector representation representing the first data unit and a second vector of the vector representation representing the second data unit.

In some embodiments, the artificial machine learning model uses one or more unsupervised embedding models. In some embodiments, the artificial machine learning model may be initialized with one or more pre-trained generative language models. In some embodiments, the artificial machine learning model may be further trained using one or more supervised datasets. In some embodiments, the paired data samples may include at least one of text data or code data. In some embodiments, the vector representation may be at least part of an embedding.

In some embodiments, the plurality of paired data samples may be naturally occurring paired data samples extracted from at least one of neighboring text data or open source code data. In some embodiments, the positive example pairs and the negative example pairs may be derived from a same batch of the training data set. In some embodiments, the artificial machine learning model may include a neural network.

Embodiments of the present disclosure may also include a system for generating a vector representation, the system including at least one processor configured to receive a training data set, the training data set including a plurality of paired data samples corresponding to positive example pairs, each positive example pair including a first data unit and a second data unit. Embodiments of the disclosed system may also include at least one processor configured to convert the training data set into at least one first vector of a vector representation.

Embodiments of the disclosed system may also include at least one processor configured to access one or more negative example pairs to contrast against the positive example pairs. Embodiments of the disclosed system may also include at least one processor configured to convert the one or more negative example pairs into one or more second vectors of the vector representation. Embodiments of the disclosed system may also include at least one processor configured to train an artificial machine learning model to generate additional vectors of the vector representation. In some embodiments of the disclosed system, the training may be based on the at least one first vector of the vector representation and the one or more second vectors of the vector representation.

In some embodiments of the disclosed system, converting the training data set into at least one first vector of the vector representation may include encoding the first data unit and the second data unit of at least one of the paired data samples independently. In some embodiments, the encoding may include inserting a first delimiter to a first position of an input sequence including the first data unit and a second delimiter to a second position of the input sequence including the first data unit. Embodiments of the disclosed system may also include at least one processor configured to insert a third delimiter to a third position of an input sequence including the second data unit and a fourth delimiter to a fourth position of the input sequence including the second data unit.

In some embodiments of the disclosed system, the at least one processor may be further configured to generate, based at least on the at least one first vector of the vector representation, a similarity score between the first data unit and the second data unit of at least one of the paired data samples. In some embodiments, the similarity score may be based on a cosine similarity between a first vector of the vector representation representing the first data unit and a second vector of the vector representation representing the second data unit.

Embodiments of the present disclosure may also include a system for generating a semantic similarity result, the system including at least one processor configured to receive, via a user interface of a user device, a query for semantic similarity, the query including a natural language input. In some embodiments of the disclosed system, the at least one processor may be configured to access an embedding space storing a plurality of vector representations generated by a machine learning model trained using positive example pairs and negative example pairs.

In some embodiments of the disclosed system, the at least one processor may also be configured to transform the natural language input to a reference vector representation. In some embodiments of the disclosed system, the at least one processor may be configured to determine the semantic similarity between the reference vector representation and at least one of the generated vector representations. In some embodiments of the disclosed system, the at least one processor may be configured to output the determined semantic similarity to the user interface of the user device.

DESCRIPTION OF EXEMPLARY EMBODIMENTS

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments. A non-patent literature document, "Text and Code Embeddings by Contrastive Pre-Training" by Neelakantan et al. (arXiv:2201.10005v1), is incorporated herein by reference in its entirety.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

Figure 1:
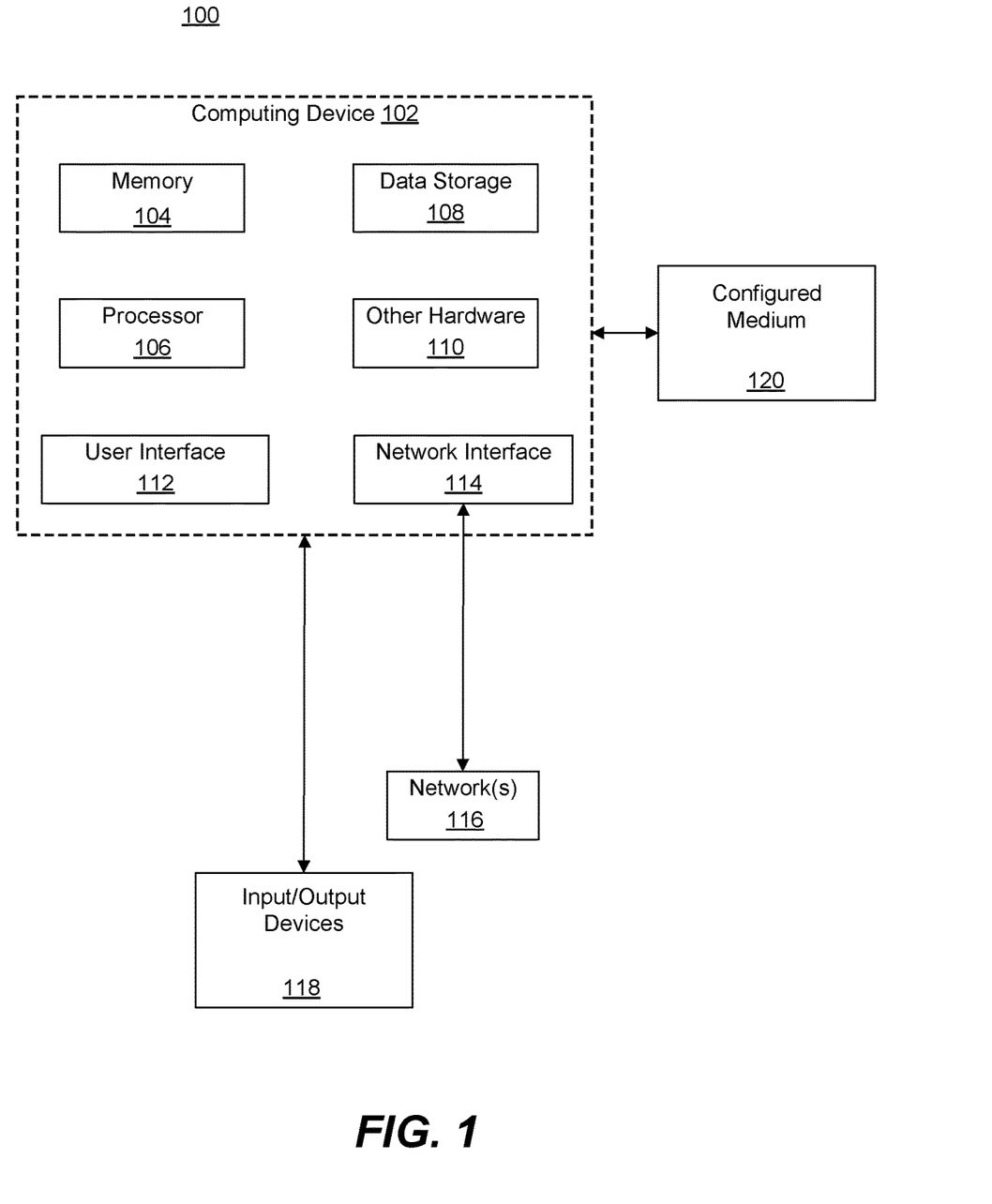
FIG. 1 illustrates an exemplary computer device for performing methods associated with generating a vector representation and/or determining semantic similarity, consistent with disclosed embodiments.

An exemplary operating environment for implementing various aspects of this disclosure is illustrated in FIG. 1. As illustrated in FIG. 1, an exemplary operating environment 100 may include a computing device 102 (e.g., a general-purpose computing device) in the form of a computer. Components of the computing device 102 may include, but are not limited to, various hardware components, such as one or more processors 106, data storage 108, a system memory 104, other hardware 110, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 1, an operating environment 100 for an exemplary embodiment includes at least one computing device 102. The computing device 102 may be a uniprocessor or multiprocessor computing device. An operating environment 100 may include one or more computing devices in a given computer system, which may be clustered, client-server networked, peer-to-peer networked within a cloud, or otherwise communicably linked. A computer system may include an individual machine or a group of cooperating machines. A given computing device 102 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 102 by using a display, keyboard, mouse, microphone, touchpad, camera, sensor (e.g., touch sensor) and other input/output devices 118, via typed text, touch, voice, movement, computer vision, gestures, and/or other forms of input/output. An input/output device 118 may be removable (e.g., a connectable mouse or keyboard) or may be an integral part of the computing device 102 (e.g., a touchscreen, a built-in microphone). A user interface 112 may support interaction between an embodiment and one or more users. A user interface 112 may include one or more of a command line interface, a graphical user interface (GUI), natural user interface (NUI), voice command interface, and/or other user interface (UI) presentations, which may be presented as distinct options or may be integrated. A user may enter commands and information through a user interface (e.g., user interface 112) or other input devices such as a tablet, electronic digitizer, a microphone, keyboard, and/or pointing device, commonly referred to as mouse, trackball or touch pad (e.g., input/output devices 118). Other input devices may include a joystick, game pad, satellite dish, scanner, or the like (e.g., input/output devices 118). Additionally, voice inputs, gesture inputs using hands or fingers, or other NUI may also be used with the appropriate input devices (e.g., input/output devices 118), such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device may also be connected to the system bus via an interface, such as a video interface. The monitor may also be integrated with a touch-screen panel or the like. Note that the monitor and/or touch screen panel can be physically coupled to a housing in which the computing device (e.g., computing device 102) is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 118 and computing device 102, based on input received from at user interface 112 and/or from network(s) 116. As used herein, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 102 in other embodiments, depending on their detachability from the processor(s) 106. Other computerized devices and/or systems not shown in FIG. 1 may interact in technological ways with computing device 102 or with another system using one or more connections to a network 116 via a network interface 114, which may include network interface equipment, such as a physical network interface controller (NIC) or a virtual network interface (VIF).

Computing device 102 includes at least one logical processor 106. The computing device 102, like other suitable devices, also includes one or more computer-readable storage media, which may include, but are not limited to, memory 104 and data storage 108. In some embodiments, memory 104 and data storage 108 may be part of a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 120 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 102, making its content accessible for interaction with and use by processor(s) 106. The removable configured medium 120 is an example of a computer-readable storage medium. Some other examples of computer-readable storage media include built-in random access memory (RAM), read-only memory (ROM), hard disks, and other memory storage devices which are not readily removable by users (e.g., memory 104).

The configured medium 120 may be configured with instructions (e.g., binary instructions) that are executable by a processor 106; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 120 may also be configured with data which is created by, modified by, referenced by, and/or otherwise used for technical effect by execution of the instructions. The instructions and the data may configure the memory or other storage medium in which they reside.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 110 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 106 (e.g., one or more CPUs, ALUs, FPUs, and/or GPUs), memory 104, data storage 108, and screens/displays, an operating environment 100 may also include other hardware 110, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 118 such as human user input/output devices (screen, keyboard, mouse, tablet, microphone, speaker, motion sensor, etc.) will be present in operable communication with one or more processors 106 and memory.

In some embodiments, the system includes multiple computing devices 102 connected by network(s) 116. Networking interface equipment can provide access to network(s) 116, using components (which may be part of a network interface 114) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 102 may operate in a networked or cloud-computing environment using logical connections to one or more remote devices (e.g., using network(s) 116), such as a remote computer (e.g., another computing device 102). The remote computer may include one or more of a personal computer, a server, a router, a network PC, or a peer device or other common network node, and may include any or all of the elements described above relative to the computer. The logical connections may include one or more local area networks (LAN), wide area networks (WAN), and/or the Internet.

When used in a networked or cloud-computing environment, computing device 102 may be connected to a public or private network (e.g., network(s) 116) through a network interface or adapter (e.g., network interface 114). In some embodiments, a modem or other communication connection device may be used for establishing communications over the network. The modem, which may be internal or external, may be connected to the system bus via a network interface (e.g., network interface 114) or other appropriate mechanism. A wireless networking component such as one comprising an interface and antenna may be coupled through a suitable device such as an access point or peer computer to a network. In a networked environment, program modules depicted relative to the computer (e.g., computing device 102), or portions thereof, may be stored in the remote memory storage device. It may be appreciated that the network connections shown are exemplary and other means of establishing a communications link between the computers may be used.

The computing device 102 may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVDd or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 108 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 108 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer readable media for the generation of text and/or code embeddings. For example, in some embodiments, and as illustrated in FIG. 1, an operating environment 100 may include at least one computing device 102, the at least one computing device 102 including at least one processor 106, at least one memory 104, at least one data storage 108, and/or any other component discussed above with respect to FIG. 1.

Figure 2:
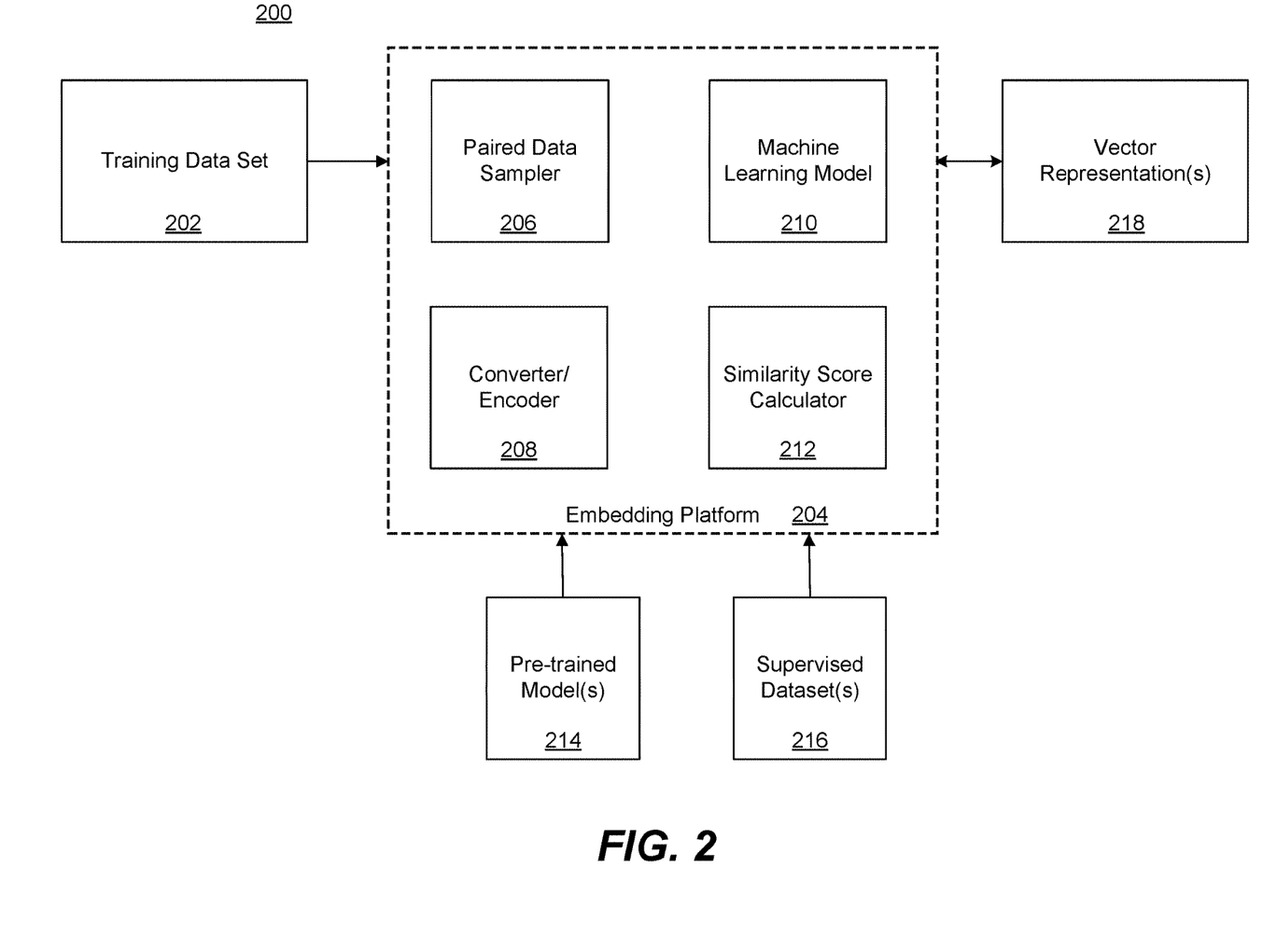
FIG. 2 illustrates an exemplary operating environment for performing methods associated with generating a vector representation, consistent with disclosed embodiments.

Consistent with disclosed embodiments, and by way of example, FIG. 2 illustrates an exemplary operating environment 200 for generating an embedding 218 (e.g., a vector representation), discussed further below (e.g., with respect to FIG. 3). Operating environment 200 may be implemented with one or more devices 102, consistent with disclosed embodiments. For example, one or more devices 102 may implement (e.g., execute operations associated with) embedding platform 204, included in operating environment 200. In some embodiments, embedding platform 204 may be configured to perform one or more operations discussed with respect to process 300. For example, embedding platform 204 may be configured to generate embedding 218. Generating an embedding may be performed after, or when, a training data set including training data set 202 is received by an embedding platform 204 as input. Embedding platform 204 may use training data set 202 to train at least one artificial machine learning model 210, which may be stored (e.g., before and/or after training), e.g., in memory 104 or data storage 108. A machine learning model (e.g., artificial machine learning model 210) may include one or more of an embedding model, a neural network (NN), a convolution neural network (CNN) model, a statistical model, a generative model (e.g., a generative neural network, or GNN), a clustering model, or a regression model, among others. In some embodiments, a machine learning model may include one or more parameters, which may be modified as part of a training process (e.g., process 300) to improve model output and/or accuracy (e.g., one or more generated embeddings).

As used herein, training data set 202 may refer to a sufficiently large batch of unlabeled data from which a training data set including a plurality of paired data samples corresponding to positive example pairs may be identified. A paired data sample may include two or more data units, which may be associated within a data structure. In some embodiments, a data sample may be sourced from one or more data sources accessible using a network (e.g., the Internet). By way of example, a data sample may be scraped from a webpage using a web crawler. A sufficiently large batch, as used herein, may refer to a size of training data set 202 that provides an optimized vector representation generation based on the size of an artificial machine learning model 210. For example, for an artificial machine learning model 210 having, for example, 300 million parameters, a sufficiently large batch size may preferably include 12,228 or more data units. As another example, for an artificial machine learning model 210 having 1.2 billion parameters, a sufficiently large batch size may preferably include 6,912 or more data units. As another example, for an artificial machine learning model 210 having 6 billion parameters, a sufficiently large batch size may preferably include 5,896 or more data units. As yet another example, for an artificial machine learning model 210 having 175 billion parameters, a sufficiently large batch size may preferably include 4,976 or more data units. In some embodiments, embedding platform 204 may be configured to reject an input (e.g., training data set 202) when it detects that the input does not include a sufficiently large batch size, and may generate a prompt for a larger batch (e.g., to display locally or remotely). As used herein, unlabeled data (which may be structured data, unstructured data, or a combination of both) may refer to open source text (e.g., Internet text) or open source code. As used herein, a positive example pair may refer to a semantically similar or contextually relevant pair of data values derived from training data, consistent with disclosed embodiments. Embedding platform 204 may include one or more program modules, such as paired data sampler 206, converter/encoder 208, artificial machine learning model 210, and/or similarity score calculator 212, discussed further below.

In some embodiments, positive example pairs may be identified by a paired data sampler 206, and, e.g., by the paired data sampler leveraging naturally occurring paired data (e.g., adjacent words, neighboring or nearby pieces of text, portions of text data within a predetermined distance threshold of each other) within the training data set 202 to determine positive example pairs, as discussed below with respect to step 310.

Consistent with disclosed embodiments, operating environment 200 including an embedding platform 204 may further be configured to convert, e.g., by one or more hardware processors, a training data set including a plurality of paired data samples corresponding to positive example pairs into at least one first vector of a vector representation (e.g., at least one first vector of an embedding). For example, embedding platform 204 may include a convertor/encoder 208, which may be configured to perform one or more operations for converting training data to paired data samples, as discussed further below with respect to step 320. In some embodiments, the converter/encoder 208 may include or may be a Transformer encoder.

In some embodiments an exemplary system including an embedding platform 204 may further be configured to, generate a similarity score between the vector representing the first data unit and the vector representing the second data unit of the paired data sample. For example, similarity score calculator 212 may execute one or more operations to determine a similarity score, as further discussed below, such as computing a cosine similarity. A data unit may include text data or code data, discussed further below.

Consistent with disclosed embodiments, operating environment 200 including an embedding platform 204 may further be configured to access training data set 202, by one or more hardware processors, and/or derive (e.g., using a paired data sampler 206) one or more negative example pairs to contrast against the identified positive example pairs from a training data set, as discussed further below (e.g., with respect to step 330).

Consistent with disclosed embodiments, operating environment 200 including an embedding platform 204 may be further configured to convert, by one or more hardware processors, one or more negative example pairs into one or more second vectors of a vector representation (e.g., one or more second vectors of an embedding). For example, converting one or more negative example pairs into one or more second vectors of a vector representation may include using a converter/encoder 208 to, for example, parse and/or encode an negative example pair, discussed further with respect to step 340. Converting identified negative example pairs into one or more second vectors of a vector representation may include any aspect described herein with respect to converting positive example pairs into at least one first vector.

Consistent with disclosed embodiments, operating environment 200 including an embedding platform 204 may be further configured to train, by one or more hardware processors, an artificial machine learning model 210 to generate additional vectors of a vector representation 218 (e.g., additional vectors of an embedding). For example, embedding platform 204 may be configured to implement one or more operations (e.g., using at least one processor) to train a machine learning model, as discussed further below with respect to step 350.

According to another embodiment of the present disclosure, a method for generating a vector representation may be provided. By way of example, FIG. 3 illustrates an exemplary process 300 for generating a vector representation. In accordance with above embodiments, process 300 may be implemented in operating environment 200, operating environment 100, any type computing device, or any combination thereof. For example, process 300 may be performed by at least one processor (e.g., processor 106) and/or other components of operating environment 200 (e.g., memory 104), or by a computing device (e.g., computing device 102). While the steps in FIG. 3 are shown in a particular order, it is appreciated that the individual steps may be reordered, omitted, and/or repeated.

Figure 3:
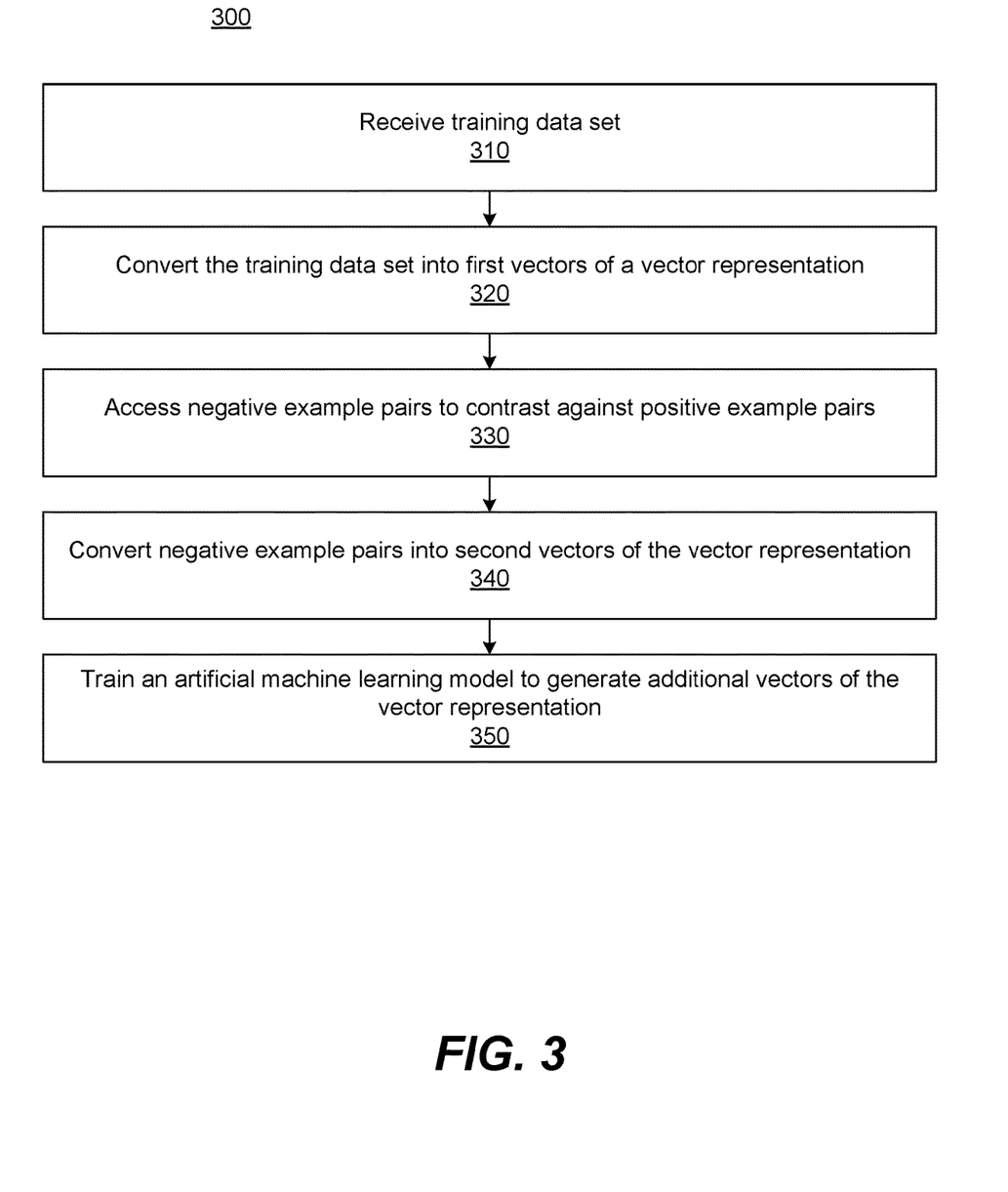
FIG. 3 illustrates an exemplary method for generating a vector representation, consistent with disclosed embodiments.

As illustrated in FIG. 3, process 300 may include a step 310 of receiving, e.g., by one or more hardware processors, a training data set. In some embodiments, the training data set may include a plurality of paired data samples corresponding to positive example pairs from the training data (e.g., training data set 202), which may be derived (e.g., by paired data sampler 206) from the training data set. In some embodiments, each positive example pair may include a first data unit and a second data unit. In some embodiments, receiving a training data set may include one or more of accessing, such as in a local or remote data storage, a file (or other data object) containing the training data set, receiving a training data set from a user interface (e.g., a keyboard), mapping a training data set to a memory address, referencing a training data set as an address in memory, receiving a training data set into a network interface, storing a training data set as a file in a local data store, retrieving a training data set from a cloud based storage, retrieving a training data set from a local or remote database, or receiving the training data set from an event published in an event streaming layer, or performing any operation to convert data to be acceptable as input for a model training process.

In some embodiments, receiving a training data set may include deriving the training data set, which may include positive example pairs. For example, paired data sampler 206 (or other program module) may derive (e.g., identify) positive example pairs from text training data by considering neighboring or nearby pieces of text (e.g., text on the Internet) as positive example pairs. As another example, a program module may derive positive example pairs from code training data, such as by delimiting a top-level doc-string in a function along with the implementation of that function as a positive example pair (e.g., as a (text, code) positive example pair). Each of the identified positive example pairs may then be combined, e.g., by the paired data sampler 206, to form a training data set, which may have fewer or no explicit labels and may include a plurality of paired data samples corresponding to a plurality of identified positive example pairs. Each positive example pair may include a first data unit and a second data unit. In some embodiments, the first data unit and the second data unit of a given example pair may include text data and/or code data (e.g., only text data, only code data, or a combination of both). Text data may include one or more of characters (e.g., Unicode characters and/or American Standard Code for Information Interchange, or ASCII, characters), strings, words, phrases, sentences, paragraphs, and so on. Code data may include, e.g., any combination of one or more functions, one or more segments of compiled code, one or more segments of uncompiled code, one or more objects, one or more integers (e.g., whole numbers), one or more floating points (e.g., fractional numbers), one or more strings (e.g., sequences of characters), one or more Boolean values (e.g., logical true or false values), one or more null values (e.g., values representing an absence of data), or any combination thereof. In some embodiments, a system including an embedding platform 204 may be configured to generate a text embedding (e.g., a vector representation of paired data samples including paired text values). In some embodiments, embedding platform 204 may receive training data set 202 and may identify, e.g., via paired data sampler 206, a training data set including positive example pairs which include text data pairs. Text data pairs (e.g., (text, text) pairs) may include, e.g., string pairs, word pairs, phrase pairs, sentence pairs, paragraph pairs, and so on. In some embodiments, a system including an embedding platform 204 may be configured to generate a code embedding (e.g., a vector representation of paired data samples including paired text and code values), such as where the system receives training data set 202 and identifies, via a paired data sampler 206. A training data set may include positive example pairs which include pairs comprising both text data and code data (e.g., (text, code) pairs). (Text, code) pairs may include, e.g., (string, code) pairs, (word, code) pairs, (phrase, code) pairs, (sentence, code) pairs, (paragraph, code) pairs, and so on. Therefore, each of the data units in each of the paired data samples may include both text data and code data. By way of example, a training data set may include a plurality of paired data samples, derived from training data set 202, and represented, e.g., as $(x_i, y_i)$, wherein each paired data sample corresponds to a positive example pair, which indicates that $x_i$ and $y_i$ are semantically similar or contextually relevant.

Process 300 may also include a step 320 of converting, e.g., by one or more hardware processors, the training data set into at least one first vector of a vector representation. Converting may include one or more of generating, transforming, embedding, mapping, and/or encoding. For example, converting the training data set into at least one first vector of a vector representation may include mapping one or more portions of text data (e.g., words) from text to numerical (e.g., embedding space) values, such as according to a mapping function. A vector may include a numerical representation of a data unit from a paired data sample, and the numerical representation may be mapped to a high-dimensional space. A vector representation may include or may be part of a matrix, a data structure, an embedding (e.g., a word embedding, a document embedding, an image embedding, an audio embedding, or a code embedding), a representation of one-hot encoded vectors, a latent representation (e.g., low dimensional vectors representing higher dimensional inputs), a high-dimensional space digital representation, or any digital representation of multiple vectors. For example, a vector representation may at least be part of an embedding, which may be represented within an embedding space, consistent with disclosed embodiments. In some embodiments, the embedding may include at least one vector representing a data unit from the paired data samples (and preferably, a plurality of vectors representing a plurality of data units from a plurality of paired data samples). In some embodiments, converting the training data set into at least one first vector of a vector representation may include encoding each positive example pair within the training data set (e.g., using a converter/encoder 208). For example, given one or more input sequences comprising data values of an identified positive example pair, (x, y), a converter/encoder 208 may process "x" and "y," either together or independently, thereby mapping (e.g., digitally mapping) the values "x" and "y" to an embedding space (e.g., a vector representation) and generating a vector for value "x" and a vector for value "y." In some embodiments, the vectors may share an embedding space of the vector representation (e.g., a vector representation 218) and thereby have a relationship represented by or based on a distance from one another.

In some embodiments, converting the training data set may include inserting delimiters into the one or more input sequences in order to structure each data value input. As used herein, a delimiter may refer to a sequence of one or more characters for specifying a boundary between separate, independent data units. Examples of a delimiter may include, without limitation, a bracket character, a parenthesis character, a semicolon character, a brace character, a pipe character, a slash character, a quote character, and a comma character. In some embodiments, a first delimiter may be inserted at a first position (e.g., a start position) of an input sequence comprising a first data unit (e.g., "x") and a second delimiter may be inserted at a second position (e.g., an end position) of the input sequence comprising the first data unit. As a further example, a third delimiter may be inserted at a third position (e.g., a start position) of an input sequence comprising a second data unit (e.g., "y") and a fourth delimiter may be inserted at a fourth position (e.g., an end position) of the input sequence comprising the second data unit. In some embodiments, a delimiter may be a special token delimiter. As used herein, a special token delimiter may refer to a symbol or sequence of symbols (which may be generated to be unique with respect to other delimiters) used to separate or delimit different components of a text or string. Special token delimiters may be used to indicate the beginning or end of a sentence, paragraph, word, or sequence of words (e.g., a phrase), and may be used in natural language processing (NLP) and machine learning tasks to segment or tokenize text into smaller, digital values, which can add stability to model training and reduce strain on processing resources. For example, a special token delimiter may include "[SOS]" at a first (e.g., start) position and "[EOS]" at a second (e.g., end) position. In some embodiments, the first and second delimiters may be distinct from the third and fourth delimiters, which may lead to more stable training, which may reduce the load on processing resources by eliminating the need for additional training. A delimiter may, in some embodiments, indicate a start position for one data unit as well as an end position for another data unit. In some embodiments, the delimiters may be concatenated with a string representing the data value to form a complete input sequence. In some embodiments, a hidden state from a last layer corresponding to a special token delimiter may be considered (e.g., extracted) as the embedding of an input sequence including that special token delimiter.

In some embodiments, after mapping the input sequence comprising the first data unit (e.g., "x") and the input sequence comprising the second data unit (e.g., "y") to embeddings (e.g., "$v_x$" and "$v_y$", respectively), exemplary process 300 may further generate a similarity score between the first data unit and the second data unit of the paired data sample (e.g., using similarity score calculator 212). In some embodiments, the similarity score may be based at least on at least one vector embedded into the vector representation. For example, a similarity score between the first data unit and the second data unit may be calculated (e.g., by processor 106), which may represent a degree of numerical similarity between the first data unit and the second data unit, which may correspond to an amount of semantic similarity (e.g., a similarity in meaning between text or code). For example, a similarity score may be calculated based on a cosine similarity between a first vector within the vector representation and a second vector within the vector representation, where the first vector may represent the converted or encoded first data unit and the second vector may represent the converted or encoded second data unit. As used herein, a node and a vector may be used interchangeably.

Further, process 300 may include a step 330 of accessing, e.g., by one or more hardware processors, one or more negative example pairs to contrast against the positive example pairs. For example, step 330 may be performed by a paired data sampler of an embedding platform. Accessing may include one or more of querying, requesting, locating, searching, retrieving, or receiving (e.g., with respect to a local or remote storage source). As used herein, a negative example pair may refer to a semantically dissimilar or contextually irrelevant pair of data values derived from training data. Deriving may include one or more of identifying, determining, detecting, calculating, extracting, or validating. In some embodiments, the negative example pairs may be derived from a same batch of the training data used to identify positive example pairs. In some embodiments, the negative example pairs may be derived using the same paired data sampler 206 used for deriving positive example pairs. Alternatively, the negative example pairs may be derived using a different paired data sampler. In some embodiments, the negative example pairs may be identified based on non-neighboring data within a batch of training data (e.g., based on data characters which are not adjacent or grouped together). For example, a batch of training data may be represented by a M×M matrix, and the batch may contain a number of positive example pairs (e.g., M). Other derived pairs of data which are non-positive (e.g., M−1), which may be located within the same batch, may be added to the same M×M matrix and used as negative example pairs.

As one example, the logits (e.g., logit functions) for one batch may be an M×M matrix, which may include multiple entry logits, logit($x_i$, $y_j$). An entry logit (e.g., each entry logit) may be expressed as logit($x_i,y_j$)=sim($x_i,y_j$)·, $\forall(i,j)$, i, j∈{1, 2, . . . , M}, where τ is a trainable temperature parameter. In some embodiments, the entries along the diagonal of the M×M matrix may be considered positive examples, and the remaining entries may be considered negative examples. A final training loss during a training process (e.g., process 300) may include the sum of the cross entropy losses on the row direction and the column direction, such as expressed in the following numpy style pseudo code:

labels=$np$·arange($M$)

$l\_r$=cross_entropy(logits,labels,axis=0)

$l\_c$=cross_entropy(logits,labels,axis=1)

loss=($l\_r+l\_c$)/2.

The accessing and utilization of such in-batch negative example pairs improves the efficiency of training an artificial machine learning model and reduces strain on processing resources at least because the in-batch negative example pairs enable re-use of computations in both the forward pass (e.g., calculations of output data derived from input data) and the backward pass (e.g., calculations regarding performing and/or tracking changes in weights or other model parameters, also referred to as training or learning).

Process 300 may further include a step 340 of converting, by one or more hardware processors, the one or more negative example pairs into one or more second vectors of the vector representation. In some embodiments, step 340 may be performed by a converter or encoder of an embedding platform, as discussed above. Converting a negative example pair into a second vector may include an aspect of converting discussed above with respect to step 320. For example, converting a negative example pair into a second vector may include mapping one or more characters of the negative example pair to one or more numerical (e.g., embedding space) values.

Process 300 may also include a step 350 of training, e.g., by one or more hardware processors, an artificial machine learning model to generate additional vectors of the vector representation. Training may include adding, modifying, or removing a model parameter, such as a model node (e.g., a neural network node), a model layer, an initialization value, or performing any operation to re-configure the artificial machine learning model. For example, at least one processor 106 may input training data (e.g., vector representations of positive and negative example pairs) to the model, may score a model output relative to an output quality threshold, and execute one or more modifications to the model. After performing one or more modifications, additional training data (e.g., validation data) may be input to the model. In some embodiments, the training may be based on the at least one first vector of the vector representation and the one or more second vectors of the vector representation. For example, at least one processor 106 may include the at least one first vector and the one or more second vectors in training data (e.g., training data set 202) for training the artificial machine learning model. In some embodiments, the training may be based on further identified positive and negative example pairs derived from the training data. For example, at least one processor 106 may access initial training data to determine at least one additional positive example pair and/or at least one negative example pair from the training data, encode the at least one additional positive/negative example pair to at least one additional vector of the vector representation, and include the at least one additional vector in subsequent training data for training the artificial machine learning model.

In some embodiments, the training may be based on the at least one first vector of the vector representation and the one or more second vectors of the vector representation. In other embodiments, the training may be based on further identified positive example pairs and/or negative example pairs from the training data. As a result, the training of an artificial machine learning model 210 uses a contrastive objective on paired data. Training in this manner produces improved machine learning model output, including embeddings that are more accurately clustered in an embedding space. As used herein, an artificial machine learning model 210 may include a supervised or an unsupervised embedding model or neural network. In some embodiments, the artificial machine learning model 210 may include or may be a text embedding model configured to generate text embeddings. In other embodiments, the artificial machine learning model 210 may include or may be a code embedding model configured to generate code embeddings. In further embodiments, the artificial machine learning model 210 may include or may be a sentence embedding model configured to generate sentence embeddings or a neural information retrieval model configured to retrieve information based on one or more embeddings. It will be appreciated that various embodiments may include artificial machine learning models 210 of different sizes, e.g., models ranging from 100 million parameters to 175 billion parameters (models having fewer or more parameters are also possible).

In some embodiments, artificial machine learning model 210 may be initialized with one or more other pre-trained models 214 as input prior to training the artificial machine learning model 210 to generate additional vectors. For example, other pre-trained models 214 may include pre-trained generative language models such as, e.g., Generative Pre-trained Transformer (GPT) models or Codex models (e.g., OpenAI Codex). Initialization with pre-trained models may cause artificial machine learning model 210 to produce more accurate outputs, and may reduce strain on processing or other computerized resources, as artificial machine learning model 210 may require less training to achieve model output of a particular quality.

In some embodiments, the artificial machine learning model 210 may be further trained (i.e., fine-tuned) using one or more supervised datasets 216 as input. For example, one or more supervised datasets may include one or more of a natural language inference (NLI) dataset, a Stanford Sentiment Treebank 2 (SST-2) dataset, a MS-MARCO (Microsoft Machine Reading Comprehension) dataset, a GLOVE (Global Vectors for Word Representation) dataset, a WORD2VEC dataset, or a FASTTEXT dataset. In some embodiments, the one or more supervised datasets 216 may include explicit negative example pairs which may be used (e.g., encoded, embedded) alongside any identified in-batch negative example pairs to further improve training of the artificial machine learning model 210, resulting in improved accuracy of the resulting trained machine learning model.

According to another embodiment of the present disclosure, a non-transitory computer readable medium comprising instructions to perform steps for generating a vector representation may be provided. The steps embodied in the instructions of the non-transitory computer readable medium may mirror one or more steps of the process 300 described herein. As such, the steps may include receiving training data and deriving a training data set, the training data set including a plurality of paired data samples corresponding to positive example pairs, each positive example pair including a first data unit and a second data unit. The steps may further include converting the training data set into at least one first vector of a vector representation. The steps may also include accessing one or more negative example pairs to contrast against the positive example pairs. Further, the steps may include converting the one or more negative example pairs into one or more second vectors of the vector representation. The steps may also include training an artificial machine learning model to generate additional vectors of the vector representation, wherein the training is based on the at least one first vector of the vector representation and the one or more second vectors of the vector representation.

Exemplary disclosed embodiments also include systems, methods, and computer readable media for generating an output (e.g., a semantic similarity) in response to a natural language input and based on a generated or stored vector representation. For example, as illustrated in FIG. 1, in some embodiments, a system may include at least one computing device 102, and the at least one computing device 102 may include at least one processor 106, at least one memory 104, or any other component discussed above with respect to FIG. 1.

Figure 4:
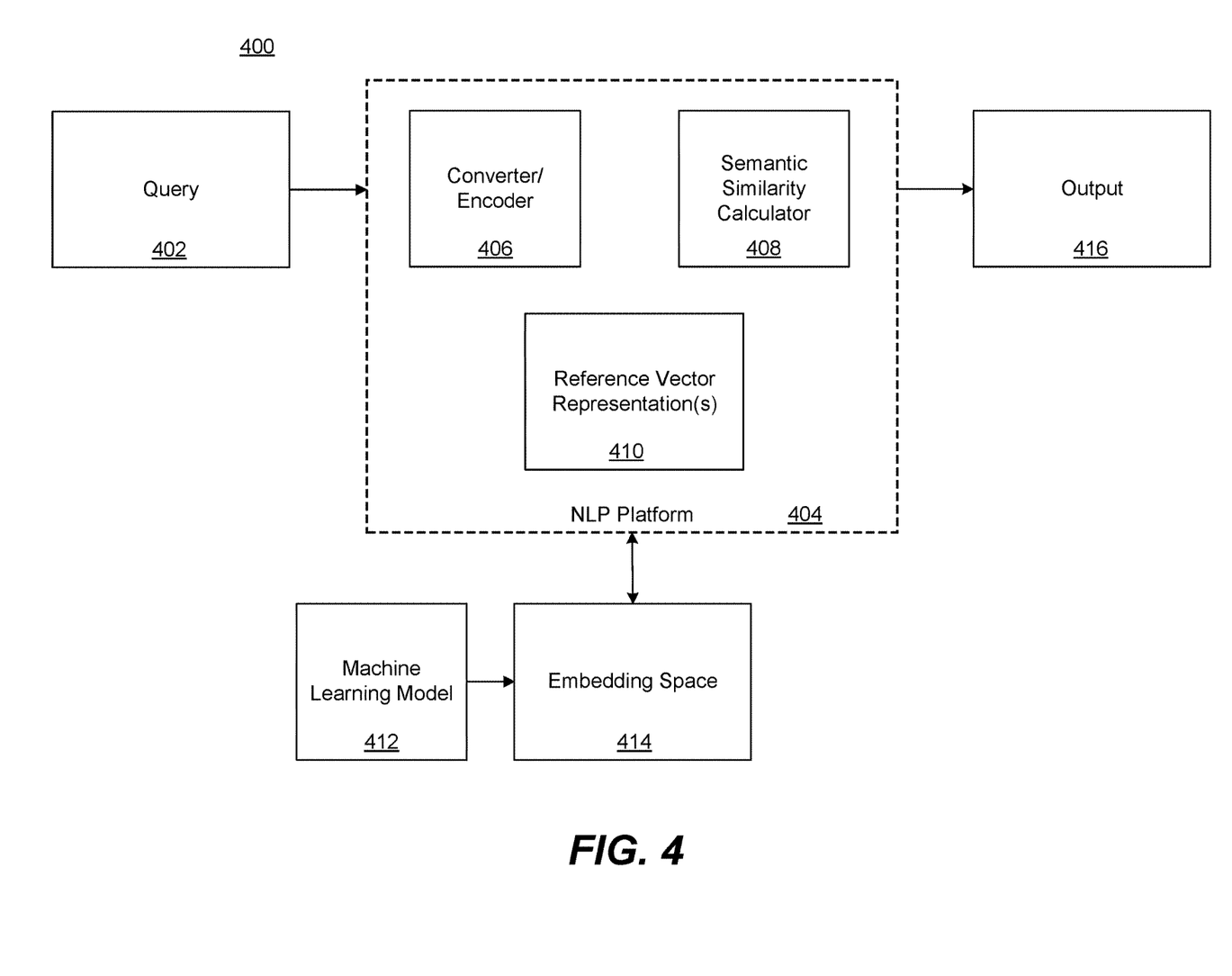
FIG. 4 illustrates an exemplary operating environment for performing methods associated with determining a semantic similarity, consistent with disclosed embodiments.

Consistent with disclosed embodiments, and by way of example, FIG. 4 illustrates an exemplary operating environment 400 including a natural language processing (NLP) platform 404 which may include one or more computing devices (e.g., computing device 102) configured to perform NLP-related operations. For example, NLP platform 404 may include one or more program modules, such as converter/encoder 406, reference vector representation(s) 410, and/or semantic similarity calculator 408, discussed further below. In some embodiments, NLP platform 404 may be configured, e.g., via at least one processor, to receive, via a user interface of a user device, a query 402 for, e.g., semantic similarity, as discussed further below with respect to step 510. In some embodiments, the query 402 may include a natural language input.

Consistent with disclosed embodiments, the operating environment 400 including an NLP platform 404 may be further configured, via at least one processor, to access an embedding space 414, as discussed further below with respect to step 520. In some embodiments, embedding space 414 may store at least one vector representation generated by a machine learning model 412, which may be trained using positive example pairs and negative example pairs, consistent with disclosed embodiments. As used herein, an embedding space 414 may include at least one of a data structure, memory partition, object in memory, file, or any other a data component storing at least one vector representation generated by a machine learning model. In some embodiment, the at least one vector representation may include at least one embedded vector, and each vector may represent a data input.

Consistent with disclosed embodiments, the operating environment 400 including NLP platform 404 may be further configured to transform the natural language input of the query 402 to at least one reference vector or at least one reference vector representation (e.g., reference vector representation(s) 410), as discussed below with respect to step 530. For example, NLP platform 404 may apply one or more transformation functions to portions of text data or code data using, e.g., converter/encoder 406 (e.g., executed by at least one processor).

Consistent with disclosed embodiments, the operating environment 400 including a NLP platform 404 may be configured, e.g., using semantic similarity calculator 408, which may be implemented by at least one processor, to determine a semantic similarity between a reference vector or reference vector representation (e.g., reference vector representation(s) 410) and at least one of the generated vector representations within the embedding space 414.

Consistent with disclosed embodiments, the operating environment 400 including a NLP platform 404 may be configured, via at least one processor, to provide the determined semantic similarity as an output 416 to the user interface of the user device, as discussed further below with respect to step 550. For example, NLP platform 404 may generate raw text (e.g., using a natural language generation, or NLG, process), uncompiled code, compiled code, a graph, a web, a visualization, or any other output related to (e.g., responsive to, based on) a query.

Figure 5:
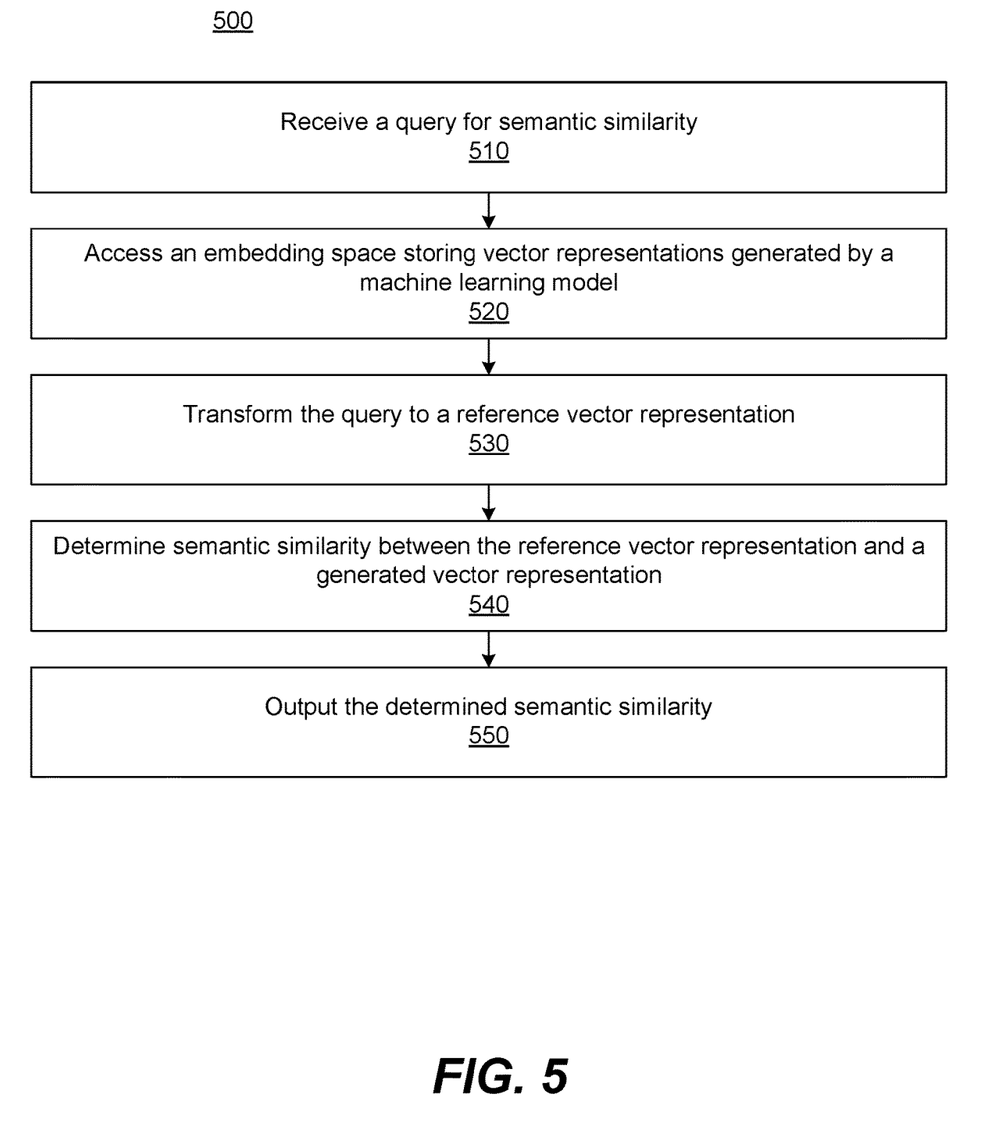
FIG. 5 illustrates an exemplary method for determining semantic similarity, consistent with disclosed embodiments.

According to another embodiment of the present disclosure, a method for generating output based on a vector representation may be provided. By way of example, FIG. 5 illustrates an exemplary method for generating an output including, e.g., a determination of semantic similarity based on a received query and one or more vector representations. In accordance with above embodiments, process 500 may be implemented in operating environment 400, operating environment 100, any type computing device, or any combination thereof. For example, process 500 may be performed by at least one processor (e.g., processor 106) and/or other components of operating environment 100 (e.g., memory 104), or by a computing device. While the steps in FIG. 5 are shown in a particular order, it is appreciated that the individual steps may be reordered, omitted, and/or repeated.

As illustrated in FIG. 5, process 500 may include a step 510 of receiving, via a user interface of a user device, a query for semantic similarity. In some embodiments, the query may include a natural language input. As used herein, a query (e.g., query 402) may refer to an input including one or more of a natural language character, string, phrase, or sentence, which may be input by, or based on input from, a user. In some embodiments, at least one processor may convert the natural language input may to an API call configured for a particular API, which may be associated with determining a model output based on the natural language input. As used herein, semantic similarity may refer to a likeness between words, phrases, sentences, paragraphs, or documents in terms of their meaning and/or content, which may be represented by embedding space representations, consistent with disclosed embodiments. As used herein, natural language may refer to a language that has developed naturally in use (e.g., spoken and/or written), as opposed to, e.g., artificial language or computer code.

The process 500 may further include a step 520 of accessing, e.g., via at least one hardware processor, an embedding space storing a plurality of vector representations generated by a machine learning model trained using positive example pairs and negative example pairs, as discussed above with respect to FIG. 4. Accessing an embedding space (e.g., embedding space 414) may include one or more of querying, requesting, locating, searching, retrieving, or receiving (e.g., with respect to a local or remote storage source). For example, accessing an embedding space may include retrieving data (e.g., values) relating to one or more vectors within at least one vector representation embedded in the embedding space 414. The retrieved data may be usable for a comparison, such as those discussed with respect to step 540. An embedding space may include any data component storing at least one vector representation generated by a machine learning model, as discussed above with respect to embedding space 414.

The process 500 may also include a step 530 of transforming, e.g., via at least one hardware processor, the natural language input to a reference vector representation (e.g., reference vector representation(s) 410). A reference vector representation may include any digital representation of multiple vectors, which may be usable to compare with one or more vectors stored in an embedding space. For example, at least one reference vector representation(s) 410 may include a plurality of reference vectors (e.g., a matrix), which may be usable for comparisons between vectors, such as vectors included in an embedding space. As used herein, a reference vector may include one or more converted reference data values. For example, a received data value including natural language text may be converted to one or more reference vector data values representing a reference vector in a reference vector representation. In some embodiments, the reference data value may be generated based on the natural language input of the query 402. In some embodiments, the reference data value generated based on natural language contained in query 402 may be embedded by a converter or encoder 406 as a reference vector (e.g., within a reference vector representation 410). Transforming a natural language input may include parsing at least one of text data or code data into separate portions (e.g., according to delimiters, discussed above), converting one or more portions of text data or code data (e.g., characters, words, or strings) to numerical space representations, applying a transformation function to one or more portions of text data or code data, or performing any other operation to represent text data or code data within a numerical space (e.g., embedding space).

Further, the process 500 may include a step 540 of determining, e.g., via at least one hardware processor, the semantic similarity between the reference vector representation and at least one of the generated vector representations. For example, semantic similarity calculator 408 (or other module) may be configured to search among one or more generated vector representations stored in the embedding space 414 to determine a relationship (e.g., compute a distance) between the reference vector and at least one vector embedded within the at least one generated vector representation. Continuing the example, a determined relationship between the reference vector and the at least one vector embedded within the at least one generated vector representation may indicate a semantic similarity value between the vectors, which may be used to derive additional output, as discussed below.

The process 500 may also include a step 550 of outputting, e.g., via at least one hardware processor, the determined semantic similarity to the user interface of the user device. Outputting the determined semantic similarity may include generating a visual and/or auditory representation (e.g., text, a graphic, an animation, a sound) of the semantic similarity (e.g., a distance between two embeddings) and/or causing an output device to present the representation to a user. In some embodiments, the NLP platform 404 may be configured to generate further output 416 based on the determined semantic similarity. For example, the NLP platform 404 may be configured to retrieve particular data from at least one vector representation stored in the embedding space, based on the natural language input and/or the determined semantic similarity, and to provide the retrieved data as further output 416. As another example, the NLP platform 404 may be configured to construct a natural language response (e.g., using one or more NLG functions) based on the natural language input and/or the determined semantic similarity, and to provide the natural language response as further output 416. As yet another example, the NLP platform 404 may be configured to generate a data visualization (e.g., clustering), a classification (e.g., a numerical classification based on text, a zero-shot classification, etc.), and/or a recommendation (e.g., a cold-start recommendation) based on one or more determined semantic similarities and/or the natural language input. As a further example, the NLP platform 404 may be configured to perform embeddings-based text searching or code searching to, e.g., return highest scored documents or repositories based on a received query 402. Furthermore, the NLP platform 404 may be configured to perform anomaly detection to identify outlier data and/or to perform diversity measurements to analyze similarity distributions, based on one or more determined semantic similarities and/or the natural language input of a query 402. By determining semantic similarity using embeddings generated using a trained artificial machine learning model (e.g., trained according to process 300), more accurate results or derivations thereof (as discussed above) may be determined in response to a query.

According to another embodiment of the present disclosure, a non-transitory computer readable medium comprising instructions to perform steps for determining semantic similarity may be provided. The steps embodied in the instructions of the non-transitory computer readable medium may mirror the steps of the process 500 described herein. As such, the steps may be configured for receiving, via a user interface of a user device, a query for semantic similarity, the query including a natural language input. The steps may further be configured for accessing, via at least one hardware processor, an embedding space storing a plurality of vector representations generated by a machine learning model trained using positive example pairs and negative example pairs. The steps may also be configured for transforming, via at least one hardware processor, the natural language input to a reference vector representation. Further, the steps may be configured for determining, via at least one hardware processor, the semantic similarity between the reference vector representation and at least one of the generated vector representations. The steps may also be configured for outputting, via at least one hardware processor, the determined semantic similarity to the user interface of the user device. In some embodiments, the querying and outputting may be performed through an application programming interface (API) call.

It will be apparent to those skilled in the art that various modifications and variations can be made for the integration of a software component into a software framework, the software framework, or the orchestration and integration of data, as executed by at least one processor. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering, repeating, inserting, and/or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A computer-implemented method for generating a semantic similarity based on a vector representation, the method comprising:
receiving a training data set extracted from unlabeled data, the training data set including a plurality of paired data samples corresponding to positive example pairs, each positive example pair including a first data unit and a second data unit, wherein the first data unit and the second data unit are located within a predetermined distance threshold of each other within the unlabeled data;
converting the paired data samples corresponding to the positive example pairs into at least one first vector of a vector representation;
accessing one or more negative example pairs within the training data set to contrast against the positive example pairs;
converting the one or more negative example pairs into one or more second vectors of the vector representation; and
training a machine learning model to generate additional vectors of the vector representation, wherein the training comprises:
initializing the machine learning model with one or more pre-trained models, the one or more pre-trained models comprising generative language models; and
training the machine learning model using contrastive training based on: the at least one first vector of the vector representation and the one or more second vectors of the vector representation;
receiving a query for semantic similarity, the query including a natural language input; and
generating, with the machine learning model and according to an embedding space, a semantic similarity result in response to the query.

2. The method of claim 1, wherein:
converting the training data set into the at least one first vector of the vector representation includes encoding the first data unit and the second data unit of at least one of the paired data samples independently; and
training the machine learning model using contrastive training comprises including at least a portion of the generated additional vectors in subsequent training data.

3. The method of claim 2, wherein the encoding includes using an encoder to independently map the first data unit and the second data unit of the at least one of the paired data samples to the vector representation.

4. The method of claim 2, wherein the encoding comprises:
inserting a first delimiter to a first position of an input sequence comprising the first data unit and a second delimiter to a second position of the input sequence comprising the first data unit; and
inserting a third delimiter to a third position of an input sequence comprising the second data unit and a fourth delimiter to a fourth position of the input sequence comprising the second data unit.

5. The method of claim 4, wherein the first and second delimiters are distinct from the third and fourth delimiters.

6. The method of claim 1, further comprising:
generating based at least on the at least one first vector of the vector representation, a similarity score between the first data unit and the second data unit of at least one of the paired data samples.

7. The method of claim 6, wherein the similarity score is based on a cosine similarity between a first vector of the vector representation representing the first data unit and a second vector of the vector representation representing the second data unit.

8. The method of claim 1, wherein the machine learning model uses one or more unsupervised embedding models.

9. The method of claim 1, wherein the one or more pre-trained generative language models comprise generative pre-trained transformers and code models.

10. The method of claim 1, wherein the machine learning model is further trained using one or more supervised datasets.

11. The method of claim 1, wherein:
the paired data samples further include text data, and
the vector representation is at least part of the embedding space.

12. The method of claim 1, further comprising:
outputting the similarity result through an interface by generating at least one of:
a visual or auditory representation of the similarity result,
a natural language response based on the similarity result, or
an embeddings-based search result, the embeddings-based search result comprising a document identified based on the query.

13. The method of claim 1, wherein the positive example pairs and the negative example pairs are derived from a same batch of the training data set.

14. The method of claim 1, wherein the machine learning model is an embedding model configured to generate text embeddings, the text embeddings comprising paired text values.

15. A system for generating a vector representation, the system comprising:
at least one processor configured to:
receive a training data set extracted from unlabeled data, the training data set including a plurality of paired data samples corresponding to positive example pairs, each positive example pair including a first data unit and a second data unit, wherein the first data unit and the second data unit are located within a predetermined distance threshold of each other within the unlabeled data;
convert the paired data samples corresponding to the positive example pairs into at least one first vector of a vector representation;
access one or more negative example pairs within the training data set to contrast against the positive example pairs;
convert the one or more negative example pairs into one or more second vectors of the vector representation; and
train a machine learning model to generate additional vectors of the vector representation by:
initializing the machine learning model with one or more pre-trained models, the one or more pre-trained models comprising generative language models; and
training the machine learning model using contrastive training based on: the at least one first vector of the vector representation and the one or more second vectors of the vector representation;
receive a query for semantic similarity, the query including a natural language input; and
generate, with the machine learning model and according to an embedding space, a semantic similarity result in response to the query, the embedding space storing a plurality of vector representations generated by the machine learning model.

16. The system of claim 15, wherein converting the training data set into at least one first vector of the vector representation includes encoding the first data unit and the second data unit of at least one of the paired data samples independently.

17. The system of claim 16, wherein the encoding includes:
inserting a first delimiter to a first position of an input sequence comprising the first data unit and a second delimiter to a second position of the input sequence comprising the first data unit; and
inserting a third delimiter to a third position of an input sequence comprising the second data unit and a fourth delimiter to a fourth position of the input sequence comprising the second data unit.

18. The system of claim 15, wherein the at least one processor is further configured to generate, based at least on the at least one first vector of the vector representation, a similarity score between the first data unit and the second data unit of at least one of the paired data samples.

19. The system of claim 18, wherein the similarity score is based on a cosine similarity between a first vector of the vector representation representing the first data unit and a second vector of the vector representation representing the second data unit.

20. A system for generating a semantic similarity result, the system comprising:
at least one processor configured to:
receive a training data set comprising a plurality of paired data samples comprising positive example pairs and negative example pairs;
convert the paired data samples corresponding to the positive example pairs into at least one first vector of a vector representation;
convert the one or more negative example pairs into at least one second vector of the vector representation;
train a model to generate additional vectors of the vector representation by:
initializing the model with one or more pre-trained models, the one or more pre-trained models comprising generative language models; and
training the model using contrastive training based on the at least one first vector and the at least one second vector;

receive a query for semantic similarity, the query including a natural language input;

access an embedding space storing a plurality of vector representations generated by the model;

transform the natural language input to a reference vector representation;

using the model, determine the semantic similarity between the reference vector representation and at least one of the generated vector representations; and output the determined semantic similarity via an interface as a visual representation or an embeddings-based search result.

* * * * *